(12) United States Patent
Goldblatt et al.

(10) Patent No.: US 8,970,708 B2
(45) Date of Patent: Mar. 3, 2015

(54) AUTOMATIC DEVICE ALIGNMENT MECHANISM

(75) Inventors: Scott B. Goldblatt, Columbia, MD (US); Ryan P. DiNello-Fass, Mount Airy, MD (US); Jeffery W. Warren, Ellicott City, MD (US); Steven J. Conard, Sykesville, MD (US)

(73) Assignee: The Johns Hopkins University, Baltimore, MD (US)

( * ) Notice: Subject to any disclaimer, the term of this patent is extended or adjusted under 35 U.S.C. 154(b) by 543 days.

(21) Appl. No.: 13/469,128

(22) Filed: May 11, 2012

(65) Prior Publication Data
US 2012/0300082 A1 Nov. 29, 2012

Related U.S. Application Data

(60) Provisional application No. 61/489,034, filed on May 23, 2011.

(51) Int. Cl.
*H04N 5/225* (2006.01)
*H04N 17/00* (2006.01)
*G06T 7/00* (2006.01)

(52) U.S. Cl.
CPC ............ *H04N 17/002* (2013.01); *G06T 7/0042* (2013.01); *G06T 2207/30204* (2013.01); *G06T 2207/30212* (2013.01)
USPC .......................................... 348/169; 348/139

(58) Field of Classification Search
USPC ............ 348/139, 169; 356/620; 382/103, 106
See application file for complete search history.

(56) References Cited

U.S. PATENT DOCUMENTS

| | | | |
|---|---|---|---|
| 5,440,492 A | 8/1995 | Kozah et al. | |
| 6,069,656 A * | 5/2000 | Silver | 348/169 |
| 6,858,826 B2 | 2/2005 | Mueller et al. | |
| 7,092,109 B2 * | 8/2006 | Satoh et al. | 356/620 |
| 7,458,165 B2 | 12/2008 | Rogers | |
| 7,852,316 B2 | 12/2010 | Ting | |
| 8,113,658 B2 | 2/2012 | Warden et al. | |
| 2010/0118122 A1 | 5/2010 | Hartman | |
| 2010/0166294 A1 | 7/2010 | Marrion et al. | |

FOREIGN PATENT DOCUMENTS

| | | |
|---|---|---|
| EP | 1606937 | 6/2009 |
| JP | 59180311 | 10/1984 |
| WO | 02096096 | 11/2002 |

* cited by examiner

*Primary Examiner* — Andy Rao
*Assistant Examiner* — Daniel Reynolds
(74) *Attorney, Agent, or Firm* — Noah J. Hayward

(57) ABSTRACT

An alignment suite includes first and second targeting devices and an optical coupler. The first targeting device is configured to perform a positional determination regarding a downrange target. The first targeting device includes an image processor. The second targeting device is configured to perform a targeting function relative to the downrange target and is affixable to the first targeting device. The optical coupler enables the image processor to capture an image of a reference object at the second targeting device responsive to the first and second targeting devices being affixed together. The image processor employs processing circuitry that determines pose information indicative of an alignment relationship between the first and second targeting devices relative to the downrange target based on the image captured.

20 Claims, 6 Drawing Sheets

AUTOMATIC DEVICE ALIGNMENT MECHANISM

CROSS-REFERENCE TO RELATED APPLICATIONS

This application claims the benefit of prior-filed U.S. Provisional Application No. 61/489,034 filed on May 23, 2011, the entire contents of which are hereby incorporated herein by reference.

STATEMENT OF GOVERNMENTAL INTEREST

This invention was made with government support under contract number N00024-03-D-6606 awarded by Naval Sea Systems Command (NAVSEA). The government has certain rights in the invention.

BACKGROUND OF THE INVENTION

1. Field of the Invention

Example embodiments generally relate to targeting devices and, more particularly, relate to a mechanism for aligning targeting devices.

2. Description of the Related Art

Far-Target Location (FTL) is a critical component in many modern battlefield situations. FTL can also be important for other applications where it is desirable to be able to identify the location of a distant target with a high degree of accuracy. A number of devices have been developed over the years to assist in FTL. A common goal of such devices has been to provide accurate target location in tactical field environments. Providing increases in accuracy may enable ordnance to be placed on target with a high degree of effectiveness. Thus, minimal ordnance may be employed with maximum effectiveness while, in many situations, keeping friendly forces relatively less exposed to risk.

Some examples of devices that have been employed to facilitate or utilize FTL include a laser designator (e.g., laser designator module (LDM)), a precision azimuth and vertical angle module (PAVAM), and a handheld target location module (HTLM). The LDM may be used to direct a beam from laser light source in order to designate or "paint" a target. Thereafter, laser guided bombs, missiles or other precision munitions may be steered toward the target using a reflection of the beam. The HTLM and PAVAM may be used to determine target coordinates. For example, the HTLM may include direct-view optical systems, night-vision, weapon sights, laser range finders, digital magnetic compasses, global positioning system (GPS) receivers and/or the like to enable operatives in the field to identify a target's location in various different conditions that may be encountered.

In some cases, it may be desirable to use devices in conjunction with one another to, for example, employ an LDM to designate a target and employ an HTLM to get the coordinates of the target at the same time. The US military has recognized the importance of the development of a common man-portable target locator/designator suite for forward observers, air controllers and scouts and developed the joint effects targeting system (JETS) to pursue a common system to serve multiple services. Development of such a common system may require multiple devices to be interoperable with one other. Thus, for example, when used together, it may be desirable to optically align the devices (e.g., boresighting of LDM/PAVAM to the HTLM). However, many of the devices may be made by different manufacturers, so direct communication to facilitate alignment may be problematic. Moreover, under some conditions, radiation downrange, which may be required to align some devices, may be undesirable or even dangerous.

SUMMARY OF THE INVENTION

Accordingly, some example embodiments may enable the provision of an automatic device alignment mechanism that may enable boresighting of devices to each other without compromising safety and security, and without introducing complicated communication requirements between devices that may be of different types and made by different manufacturers. Moreover, some example embodiments may provide a relatively lightweight and still reproducible mechanism for implementing alignment of devices so that operators can more easily carry and use the technology in the field.

In one example embodiment, an alignment suite is provided. The alignment suite comprises first and second targeting devices and an optical coupler (e.g., an optomechanical coupler). The first targeting device is configured to perform a positional determination regarding a downrange target. The first targeting device includes an image processor. The second targeting device is configured to perform a targeting function relative to the downrange target and is affixable to the first targeting device. The optical coupler is disposed to enable the image processor to capture an image of a reference object disposed at the second targeting device responsive to the first and second targeting devices being affixed together. The image processor employs processing circuitry configured to determine pose information indicative of an alignment relationship between the first and second targeting devices relative to the downrange target based on the image captured.

According to another example embodiment, a method of aligning devices is provided. The method includes receiving an indication of a trigger event at a first targeting device configured to perform a positional determination regarding a downrange target, capturing (e.g., at an image processor of the first targeting device) an image of a reference object disposed at a second targeting device configured to perform a targeting function relative to the downrange target at least in part responsive to the first targeting device being affixed to the second targeting device, and determining pose information indicative of an alignment relationship between the first and second targeting devices relative to the downrange target based on the image captured.

BRIEF DESCRIPTION OF THE DRAWINGS

Figure 1:
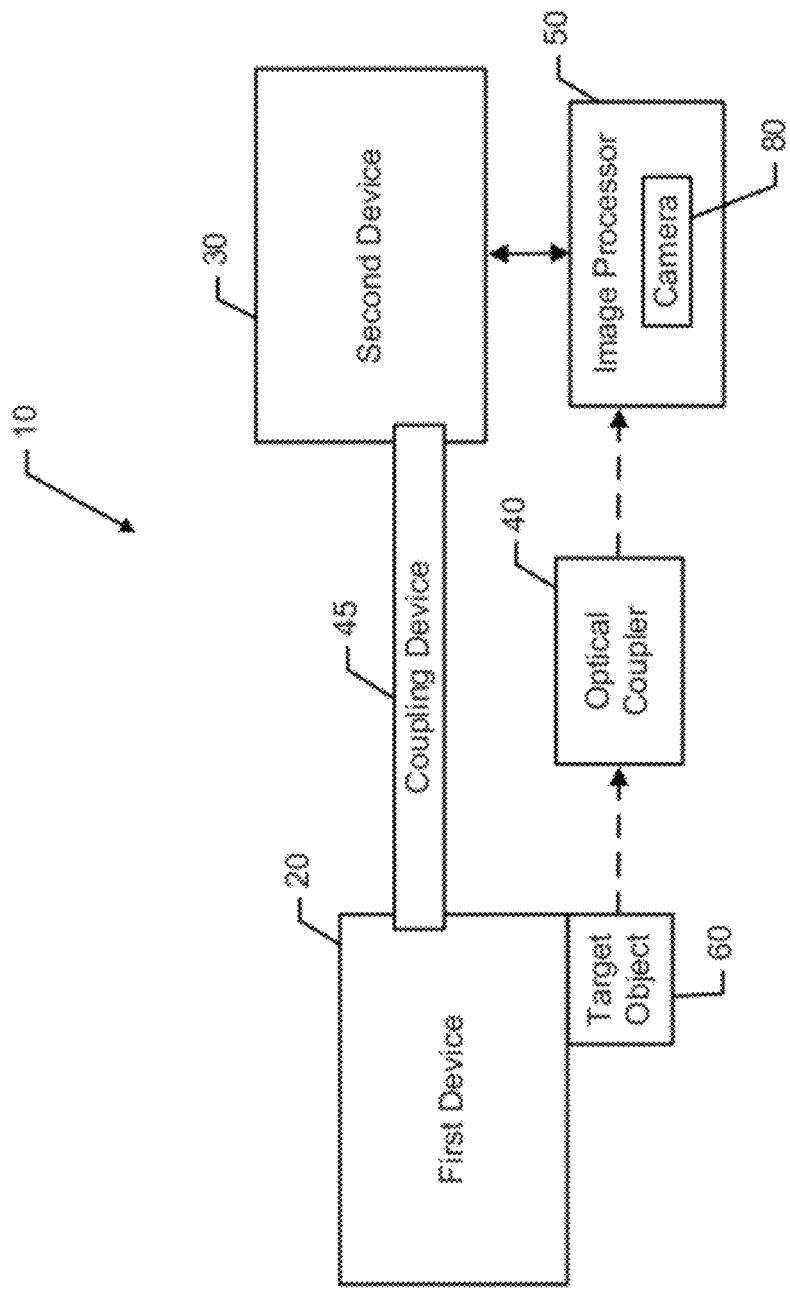
Figure 2:
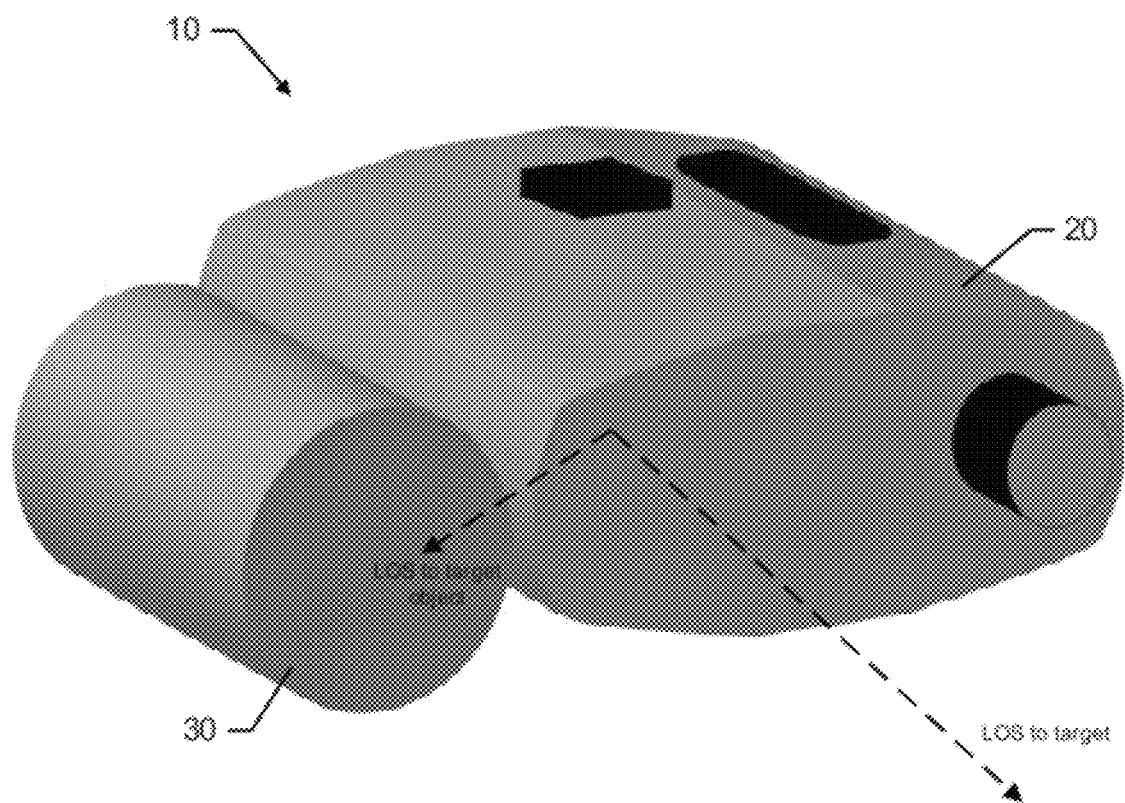
Figure 3:
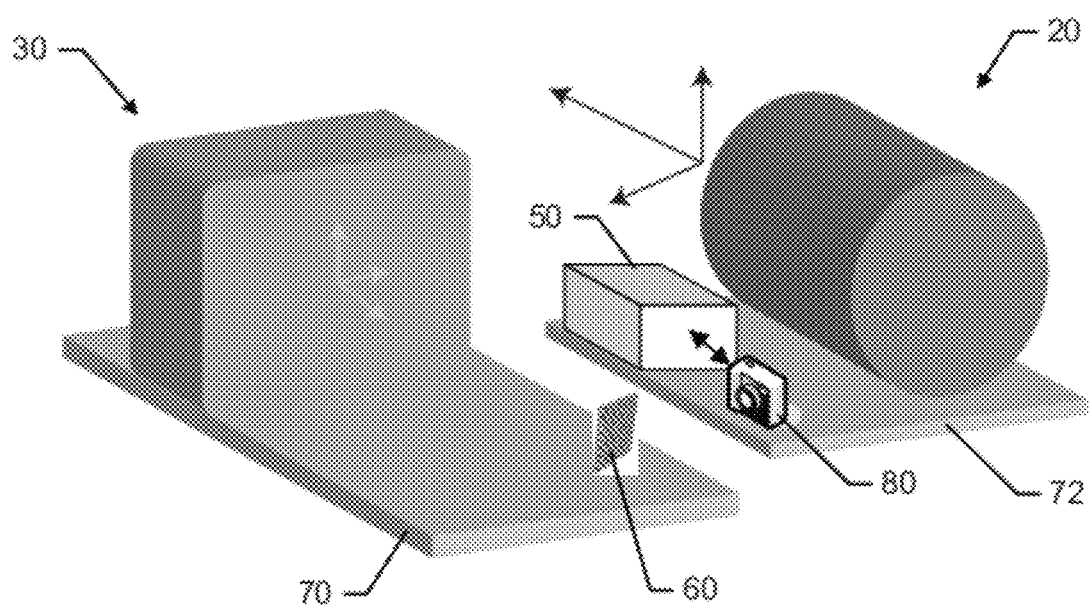
Figure 4:
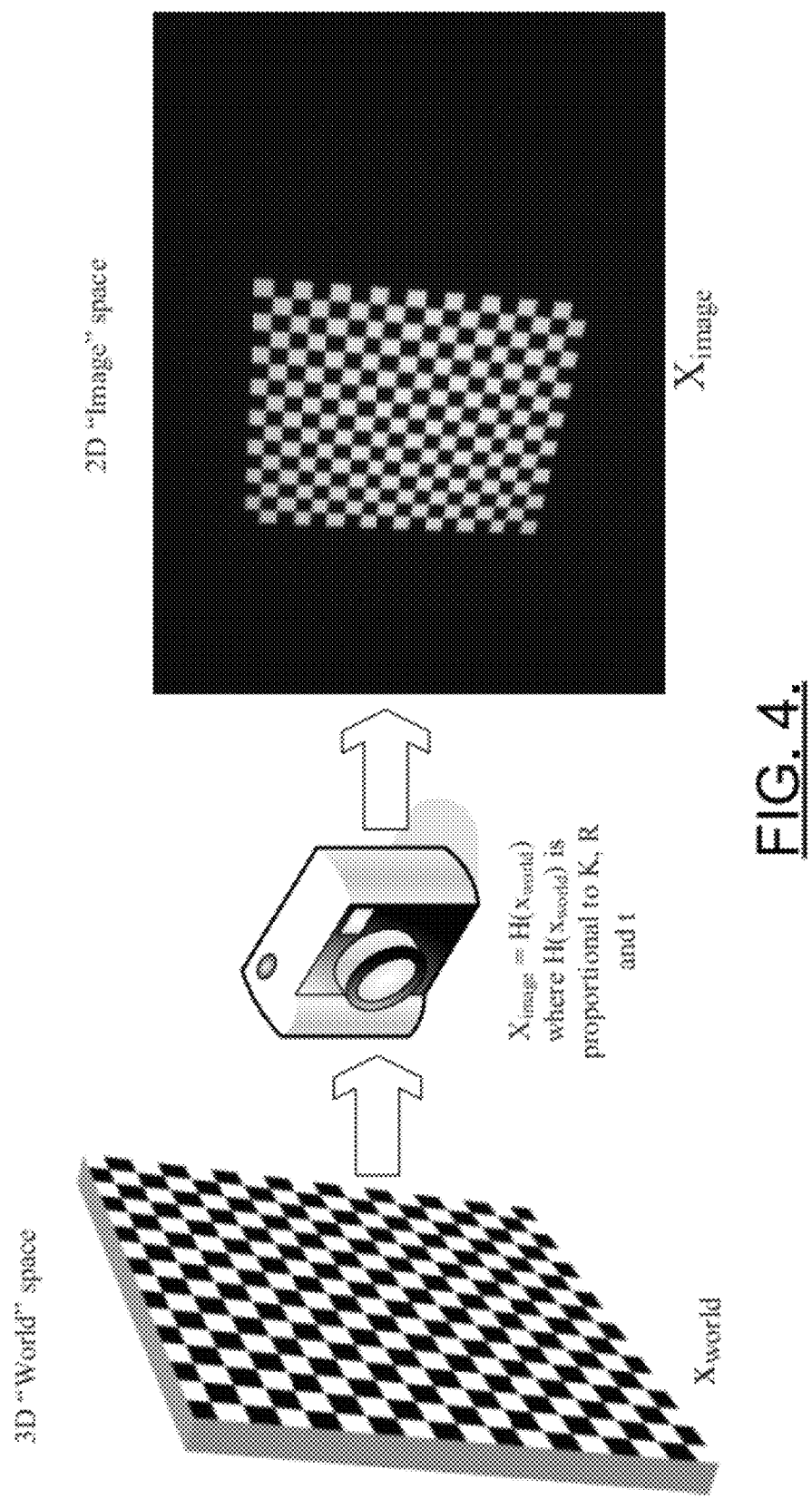
Figure 5:
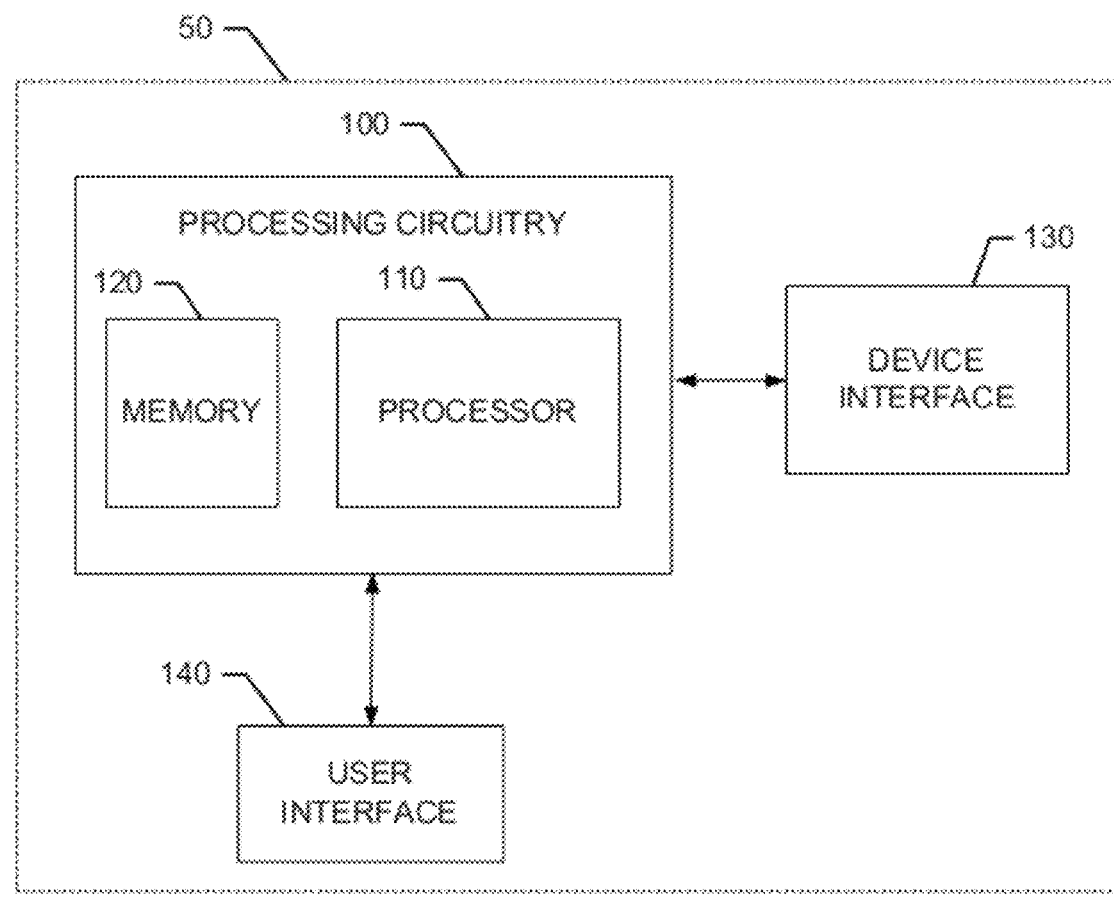
Figure 6:
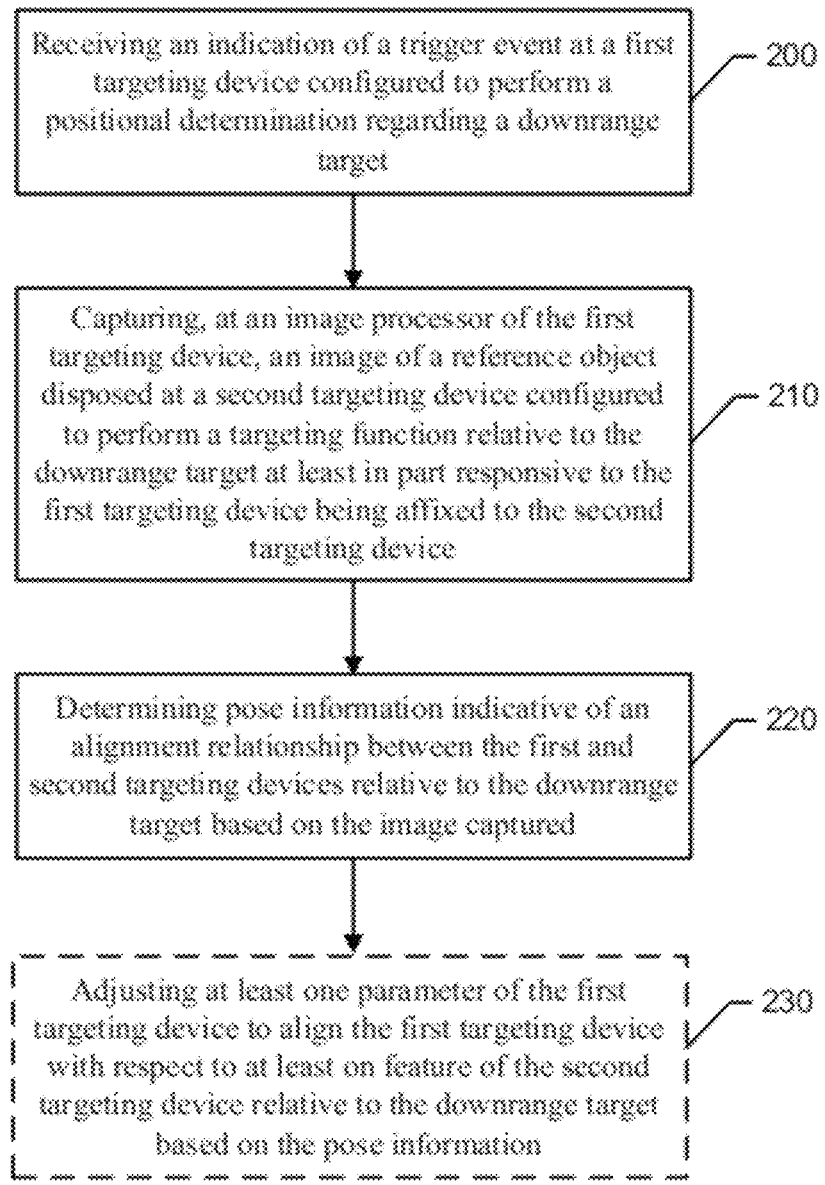

Having thus described example embodiments of the invention in general terms, reference will now be made to the accompanying drawings, which are not necessarily drawn to scale, and wherein:

FIG. 1 is a block diagram of a system of components comprising a device alignment suite according to an example embodiment;

FIG. 2 illustrates an example structure forming the device alignment suite of an example embodiment;

FIG. 3 illustrates a view of the devices of FIG. 2, with external casings and various other components removed to facilitate an explanation of how an image processor of an example embodiment may operate relative to capture of an image to be used for pose information determination;

FIG. 4 illustrates an example of pose estimation that may be employed in connection with an example embodiment;

FIG. 5 illustrates a block diagram of one instance of the image processor 50 according to an example embodiment; and FIG. 6 illustrates a block diagram of a method of aligning devices according to an example embodiment.

DETAILED DESCRIPTION

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout.

Some example embodiments may improve the ability of field operatives to align devices that are used together for target location purposes. Generally speaking, the devices may include one that is or employs some sort of camera (e.g., a camera usable in connection with visible light, low light, IR, etc.), and another that is an optical device such as a laser, specialized imager, an attitude sensor (e.g., an inertial navigation system (INS)) or other non-optical device. In some cases, the alignment of the devices may be referred to as boresighting. Boresighting of devices using some example embodiments may be accomplished relatively quickly and easily in either day or night conditions without any need to radiate downrange. With respect to a combination of devices forming a target locator/designator suite (e.g., an LDM/HTLM combination or a PAVAM/HTLM combination) boresighting may have different meanings. For example, for an LDM/HTLM combination, boresighting may include designating the crosshair of the HTLM to correspond to the location of the LDM beam. Meanwhile, for a PAVAM/HTLM combination, boresighting may include generating co-alignment parameters that enable accurate target location computation.

Some example embodiments may automatically perform the alignment described herein, without operator input to undertake complicated calibration procedures or connect calibration gear. In this regard, for example, a relatively simple mating of devices, in some cases with an optical coupling device, or merely via mutually accessible optical communication windows, may be employed to provide passive optical communication between the devices to be aligned. Thereafter, passive image analysis may be performed as described herein in order to enable co-alignment procedures to be undertaken. In an example embodiment, one of the devices to be aligned may employ an image capturing device (e.g., a camera or auto-alignment camera), and the other device may have an optical target of known characteristics. The auto-alignment camera (or a processing device in communication with the auto-alignment camera) may then employ image processing techniques to perform pose determination relative to the image of the known optical target to determine alignment parameters to apply to align the two devices that are to be aligned. Example embodiments may obtain a three dimensional orientation of a two dimensional (planar) reference object (e.g., a checkerboard pattern) in order to determine pose information of the reference object and align the devices accordingly.

FIG. 1 is a block diagram of a system of components comprising a device alignment suite 10 according to an example embodiment. FIG. 2 illustrates an example structure forming the device alignment suite 10 of an example embodiment. Referring to FIGS. 1 and 2, the device alignment suite 10 includes a first device 20, a second device 30, an optical coupler 40, and an image processor 50. Given that the image processor 50 may be internal to the first device 20 (or the second device 30), the image processor 50 is not visible in FIG. 2. Furthermore, the mating arrangement shown in FIG. 2 is such that the optical coupler 40 is not visible in FIG. 2. Although FIG. 2 illustrates the second device 30 mated with the first device 20 such that the second device 30 lies along side the first device 20 (e.g., in a "sidecar" position), it may also be possible to arrange the first and second devices 20 and 30 in other ways.

The physical coupling provided to mate the first and second devices 20 and 30 does not need to be a structure capable of precise calibration. As such, the physical coupling may be relatively lightweight and could even be relatively unsophisticated. By performing an alignment of the first and second devices 20 and 30 using an example embodiment, steps associated with actively transmitting downrange and/or assembly/alignment of sophisticated brackets and leveling/alignment structures may be avoided. Instead, a lightweight and simple connection (i.e., one that can be made in darkness or in field conditions) may be employed and the devices may measure autoalignment in response to making the connection and/or powering on the devices after mating of the devices.

In FIG. 1, dashed connection lines represent operable coupling in the form of an optical connection (e.g., an optical channel, or windows that are securely accessible to each other in each device), and solid lines represent electrical connection (e.g., via electrical transmission cables of any suitable type, or even wireless transmission in some cases). As can be appreciated from FIG. 1, there is no requirement for any electrical connection between the first device 20 and the second device 30. Instead, the only required coupling between the first and second devices 20 and 30 may be provided by the optical coupler 40. In some cases, the first and second devices 20 and 30 may be physically connected or mated together via a coupling device 45 (e.g., one or more braces, latches, snaps, brackets, connectors and/or the like) in order to facilitate a stable physical relationship between the first and second devices 20 and 30 with respect to the orientation and distance between the devices so that the alignment of the devices may be presumed to be accurate for the time period that the first and second devices 20 and 30 are mated together.

The first device 20 of an example embodiment may be an HTLM or other target locator device or optical imaging device. Meanwhile, the second device 30 may be an LDM, PAVAM or another designator, imaging, navigation or locator device. The image processor 50 may include a digital camera 80 (e.g., an example of an auto-alignment camera) capable of forming a digital image file from a captured image. As such, the image processor 50 includes all hardware, such as a lens or other optical component(s), and software necessary for creating a digital image file from a captured image. In an example embodiment, the image processor 50 may further include a processing element such as a co-processor to process image data and an encoder and/or decoder for compressing and/or decompressing image data. The encoder and/or decoder may encode and/or decode according to a JPEG standard format or another like format. However, in other embodiments, the image processor 50 may rely upon processing resources of the first device 20 to perform some or all of the functions attributable to the image processor 50. In some embodiments, the image processor 50 may be further configured to analyze image data captured with respect to a reference object 60 disposed at the second device 30 to compare the captured data to known parameters in order to determine pose information that is usable for alignment of the first and second devices 20 and 30 as described in greater detail below.

The reference object 60 may be a known object having a size, shape, dimensions and/or other characteristics that are known in advance. In an example embodiment, the reference object 60 may be a checkerboard pattern of alternating black and white squares. The squares may each have a known size, and may be arranged to form the checkerboard pattern also having a known size. The checkerboard pattern of squares may be useful since it is relatively easy to reproduce in an accurate fashion using micro-lithography techniques. However, other patterns could be used in alternative embodiments. For example, a triangular pattern or any number of other patterns that are reproducible with accuracy may be employed in other embodiments.

In some cases, the reference object 60 may be provided as a single face of a relatively flat object. However, some embodiments may benefit from visibility of multiple faces of the reference object 60. Accordingly, in some embodiments, the reference object 60 may take the form of a cube, which may be positioned so that multiple faces of the cube may be visible (or potentially visible) by the image processor 50. In some embodiments, it may be desirable to keep the reference object 60 and any camera components to a relatively small size so that weight and size constraints can be minimized. Thus, for example, some embodiments may employ a reference object 60 having about a 1 cm×1 cm size. However, larger or smaller reference objects may be employed in other embodiments.

In an example embodiment, to accomplish the alignment of the first and second devices 20 and 30 using the pose information, the image processor 50 may need to be optically coupled to the reference object 60. The optical coupler 40 may provide the optical coupling between the first and second devices 20 and 30, and more specifically between the image processor 50 and the reference object 60. In some cases, both the image processor 50 (or at least a camera or camera lens thereof) and the reference object 60 may be oriented on respective sides of the first and second devices 20 and 30 that are closest to each other when the first and second devices 20 and 30 are mated with each other. In such examples, the image processor 50 and reference object 60 may be provided within a housing of the first and second devices 20 and 30, but may be visible to each other via respective windows disposed at the corresponding sides of the devices when the devices are mated together. The viewing windows could be arranged to be proximate to each other when the devices are mated together, or to be a relatively small distance (e.g., less than a couple of inches or centimeters, or a fraction of an inch or centimeter) from each other when the devices are mated. In such an example, the optical coupler 40 may be embodied as the viewing windows disposed at each of the first and second devices 20 and 30. However, in other examples, the optical coupler 40 may be embodied as a viewing tunnel or light shield that may be fitted between the viewing windows disposed at each of the first and second devices 20 and 30. Such a viewing tunnel or light shield may block external visibility of any light generated to facilitate operation of the image processor 50 such that the device alignment suite 10 may be operated securely and safely without compromising the position of the operators.

It should be appreciated that in some cases either or both of the first and second devices 20 and 30 may include a camera (e.g., a primary camera) or other optical device for viewing or projecting downrange toward a target. However, in some cases, the image processor 50 described herein may not be used for analyzing data captured relative to any transmission or viewing downrange at the target. Instead, the reference object 60 viewed by the image processor 50 is disposed in the device with which alignment is desired. Thus, in many instances, the line of sight connecting the devices to be aligned will be substantially perpendicular to the line of sight connecting the first and second devices (or the primary cameras thereof) to the target. As such, the target is downrange, but the reference object is often adjacent or at least relatively proximate to the device performing the alignment and is perpendicular to the line of sight to the target itself.

FIG. 3 illustrates a view of the devices of FIG. 2, with external casings and various other components removed to facilitate an explanation of how the image processor 50 of an example embodiment may operate relative to capture of an image to be used for pose information determination. FIG. 4 illustrates an example of pose estimation that may be employed in connection with an example embodiment.

As shown in FIG. 3, the reference object 60 may be disposed on a first platform 70 or bench structure within the second device 30. Meanwhile, an auto-alignment camera 80, which may form a portion of the image processor 50 may be disposed on a second platform 72 or bench within the first device 20. The first and second platforms 70 and 72 may be configured to lie in a plane that is substantially perpendicular to the surface of the earth when the first and second devices 20 and 30 are mated together and one of the devices is leveled (e.g., using a tripod or other device). In an example embodiment, the first and second platforms 70 and 72 may be configured to lie parallel to each other and, in some cases, may even lie in the same plane when the first and second devices 20 and 30 are mated together. However, in other embodiments, the first and second platforms 70 and 72 need not necessarily lie in the same plane, but may instead lie in parallel planes that align the auto-alignment camera 80 to have visibility of the reference object 60 (e.g., via the optical coupler 40). However, unlike conventional arrangements that may employ heavy and complicated brackets to attempt to hold devices in a precise alignment with one another using a calibration process, where repeatability and perhaps also parallel or coplanar platforms may be required, some example embodiments may conduct automatic alignment of the first and second devices 20 and 30 even if the first and second platforms 70 and 72 are non-coplanar or lie in planes that are not parallel to each other. In this regard, the alignment mechanism described herein employs pose information, which may include pose information indicating that the first and second platforms 70 and 72 are non-coplanar or lie in planes that are not parallel to each other, to perform boresighting using electronic and/or optical alignment without brute force physical alignment being required.

In addition to having a known size, the reference object 60 may have other known characteristics. For example, the reference object 60 may be disposed at a known position within the second device 30 to facilitate optical coupling to the first device 20. Moreover, the reference object 60 may be oriented at a predetermined or fixed angle relative to a side of the second device 30. In some embodiments, as shown in FIG. 3, the reference object 60 may be disposed to have about a 45 degree angle relative to the side of the second device 30. In other words, an angled face of the reference object 60 may be offset from being perpendicular to a line of sight between the image processor 50 (or auto-alignment camera 80) and the reference object 60 by an angle in the range of approximately 0 degrees through approximately 50 degrees. In one exemplary embodiment the angle is approximately 45 degrees. Thus, in such an example, the auto-alignment camera 80 may generally be expected to generate an image of the reference object 60 that corresponds to a 45 degree pose angle. In an example embodiment, the image processor 50 may be programmed to have access to a reference image of the reference object 60 disposed at a predetermined pose (e.g., a 45 degree pose angle). The image processor 50 may also have access to parametric data associated with a reference image (e.g., parametric information descriptive of features of the real world reference object that may be based on a reference image). Thus, it is not required that an actual reference image be stored. Instead, data descriptive of parameters of a reference image (i.e., reference image feature data) is be used. Accordingly, the image processor 50 may be configured to compare the reference image (or at least reference image feature data indicative of the current geometry of the reference object 60) to a live or recently captured image of the reference object 60 (or feature data associated with a live or recently captured image) generated via the auto-alignment camera 80 in order to determine pose information indicative of even very small changes in the pose angle that correspond to alignment differences that the image processor 50 may thereafter account for to align the first and second devices 20 and 30.

As shown in FIG. 4, $x_{world}$ may represent feature locations regarding the reference object 60 in three dimensional (3D) "world" space. Meanwhile, $X_{image}$ may represent feature locations of the reference object 60 in two dimensional image (2D) space. The auto-alignment camera 80 may have calibration parameters (K) that may be determined or known beforehand. Given K, $x_{world}$ and $X_{image}$, example embodiments may attempt to determine a reference object rotation matrix (R), which corresponds to pose information that can be used for device alignment. Generally speaking, $X_{image}=H(x_{world})$ where $H(x_{world})$ is proportional to K, R and t (t reference being a reference object translation parameter). The ref feature data provides advance knowledge to the image processor 50 regarding parameters of the reference object 60 (e.g., information defined by $x_{world}$). The image processor 50 is also programmed with information relating to lens calibration such as focal length, distortion characteristics, and/or the like, so that K is also known. After capturing an image of the actual pose provided by the reference object 60 based on a current relationship between the first and second platforms 70 and 72 based on the mating currently employed between the first and second devices 20 and 30, K, $x_{world}$ and $X_{image}$ are all known values and R and t may be determined to indicate reference object plane rotation and location. When the reference object plane rotation and location are determined (i.e., when pose information is determined), the pose information may be used to adjust parameters of one device (e.g., the first device 20) to align the device to the other device (e.g., the second device 30). Thus, the first and second devices 20 and 30 may be boresighted so that, for example, a crosshair of the first device 20 may be digitally aligned with a laser beam projected by the second device 30. As such, parameters of the first device 20 may be altered based on the pose information so that at least one feature of the second device 30 is accounted for with respect to alignment of at least one feature of the first device 20.

In some cases, a plurality of images (e.g., 20-30) may be captured of perform camera lens calibration prior to deployment of the auto-alignment camera 80. After deployment and subsequent optical coupling of the first and second devices 20 and 30, the auto-alignment camera 80 may capture an image of the reference object 60 and perform pose estimation in association with coarse and fine estimation stages. During the coarse estimation stage, a relatively rough estimate of where the corners of the reference object 60 are may be determined. In this regard, for example, edge detection and subpixel corner detection may be determined to facilitate generation of reference image feature data. The result of the course estimation stage may then provide an input for a fine estimation stage in which subpixel corner detection may be performed. Based on edge detection and corner detection of the image captured relative to the reference image feature data, a software algorithm may be employed to determine the corresponding pose information. Information relating to camera characteristics may also be accounted for in order to determine the pose information (e.g., plane rotation and location) based at least in part of features such as the outer edge detection and the subpixel corner detection.

Some example embodiments may therefore be enabled to perform nonlinear pose estimation using only passive image analysis. In this regard, in some cases, only one of the devices may need power and/or processing capability devoted to the task of executing alignment as described herein. For example, the first device 20 may employ a separate power supply and/or processor for supporting operation of the image processor 50, or may utilize onboard power and/or processing resources of the first device 20 to execute the alignment described herein, but the second device 30 may not require devotion of any power or processing resources to support the alignment processes. The alignment may not require any special test equipment, may be relatively automatic, and may even work at different temperatures.

In some embodiments, the image processor 50 may operate automatically to perform the alignment of the first and second devices 20 and 30 responsive to power being applied to the image processor 50 and/or responsive to connection of the first device 20 to the second device 30. Thus, for example, when the first device 20 is powered on in situations where the image processor 50 is powered from the first device 20, the image processor 50 may employ the auto-alignment camera 80 to attempt to obtain an actual image of the reference object 60. If an actual image is obtainable, the image processor 50 may perform boresighting based on a determination of the pose information learned by comparing feature data associated with the actual image to the stored reference image feature data. In some embodiments, the image processor 50 may only operate upon power up to establish alignment between the first and second devices 20 and 30, and the alignment may be assumed to be accurate during the time that the devices are operated together. However, in other examples, the image processor 50 may periodically update images and therefore also update pose information that may be used for alignment of the first and second devices 20 and 30. In still other embodiments, the image processor 50 may be manually instructed to perform or repeat alignment procedures by operator action (e.g., by cycling power or by pressing an alignment button). In some cases, mating of the first and second devices 20 and 30 may trigger an alignment process (e.g., due to the mating indicating presence of the second device 30 to trigger the image processor 50 to perform alignment procedures.

In some embodiments, the image processor 50 (or at least some components thereof) may operate under computer control, or at least under the control of some form of control element that may provide control signals for operation of the image processor 50. FIG. 5 illustrates a block diagram of one instance of the image processor 50 according to an example embodiment.

As shown in FIG. 5, the image processor 50 may include may include or otherwise be in communication with processing circuitry 100 that is configurable to perform actions in accordance with example embodiments described herein. As such, for example, the functions attributable to the image processor 50 may be carried out by the processing circuitry 100.

The processing circuitry 100 may be configured to perform data processing, control function execution and/or other processing and management services according to an example embodiment of the present invention. In some embodiments, the processing circuitry 100 may be embodied as a chip or chip set. In other words, the processing circuitry 100 may comprise one or more physical packages (e.g., chips) including materials, components and/or wires on a structural assembly (e.g., a baseboard). Although the processing circuitry 100 may be specifically designed for control of the image processor 50 (i.e., configured to perform pose estimation and thereafter conduct alignment of the first and second devices 20 and 30 based on the pose estimation), in some embodiments the processing circuitry 100 may be embodied as all or a portion of the processing circuitry of the first device 20, or may be a coprocessor of the first device 20. Thus, for example, the processing resources of the first device 20 may handle all of the normal processing functions of the first device 20 and also handle processing associated with data collection, pose estimation, boresighting and/or the like for the image processor 50.

In an example embodiment, the processing circuitry 100 may include one or more instances of a processor 110 and memory 120 that may be in communication with or otherwise control a device interface 130 and, in some cases, a user interface 140. As such, the processing circuitry 100 may be embodied as a circuit chip (e.g., an integrated circuit chip) configured (e.g., with hardware, software or a combination of hardware and software) to perform operations described herein.

The user interface 140 (if implemented) may be in communication with the processing circuitry 100 to receive an indication of a user input at the user interface 140 and/or to provide an audible, visual, mechanical or other output to the user. As such, the user interface 140 may include, for example, a display, one or more buttons or keys (e.g., function buttons), and/or other input/output mechanisms (e.g., keyboard, microphone, speakers, cursor, joystick, lights and/or the like). Many field operable embodiments may eliminate the user interface 140 all together, or at least utilize a minimalist form of user interface (e.g., one or more simple buttons).

The device interface 130 may include one or more interface mechanisms for enabling communication with other devices. In some cases, the device interface 130 may be any means such as a device or circuitry embodied in either hardware, or a combination of hardware and software that is configured to receive and/or transmit data from/to devices in communication with the processing circuitry 100. Thus, for example, the device interface 130 may enable the processing circuitry 100 of the image processor 50 to communicate with and/or interact with the auto-alignment camera 80 and/or the processor or other circuitry of the first device 20.

In an exemplary embodiment, the memory 120 may include one or more non-transitory memory devices such as, for example, volatile and/or non-volatile memory that may be either fixed or removable. The memory 120 may be configured to store information, data, applications, instructions or the like for enabling the image processor 50 to carry out various functions in accordance with exemplary embodiments of the present invention. For example, the memory 120 could be configured to buffer input data for processing by the processor 110. Additionally or alternatively, the memory 120 could be configured to store instructions for execution by the processor 110. As yet another alternative, the memory 120 may include one or more databases that may store a variety of data sets indicative of patterns and/or encoding schemes to be employed. Among the contents of the memory 120, applications may be stored for execution by the processor 110 in order to carry out the functionality associated with each respective application. In some cases, the applications may include directions for control of the image processor 50 and/or the components thereof to achieve desirable operation of the image processor 50.

The processor 110 may be embodied in a number of different ways. For example, the processor 110 may be embodied as various processing means such as one or more of a microprocessor or other processing element, a coprocessor, a controller or various other computing or processing devices including integrated circuits such as, for example, an ASIC (application specific integrated circuit), an FPGA (field programmable gate array), or the like. In an example embodiment, the processor 110 may be configured to execute instructions stored in the memory 120 or otherwise accessible to the processor 110. As such, whether configured by hardware or by a combination of hardware and software, the processor 110 may represent an entity (e.g., physically embodied in circuitry—in the form of processing circuitry 100) capable of performing operations according to embodiments of the present invention while configured accordingly. Thus, for example, when the processor 110 is embodied as an ASIC, FPGA or the like, the processor 110 may be specifically configured hardware for conducting the operations described herein. Alternatively, as another example, when the processor 110 is embodied as an executor of software instructions, the instructions may specifically configure the processor 110 to perform the operations described herein.

In an example embodiment, the processor 110 (or the processing circuitry 100) may be embodied as, include or otherwise control the image processor 50. As such, in some embodiments, the processor 110 (or the processing circuitry 100) may be said to cause each of the operations described in connection with the image processor 50 by directing the image processor 50 to undertake the corresponding functionalities responsive to execution of instructions or algorithms configuring the processor 110 (or processing circuitry 100) accordingly. For example, the processor 110 may be configured to analyze image data captured responsive to mating two devices together so that the image processor 50 of one of the devices may determine pose information relative to a reference object disposed in the other device and visible by the image processor via some form of optical coupling. The processor 110 may thereafter be configured to use the pose information to perform an alignment (e.g., boresighting or an optical alignment) of the two devices responsive to execution of instructions stored in the memory 120.

Embodiments of the present invention may therefore be practiced using an apparatus such as the one depicted in FIG. 5. Some embodiments may be practiced in connection with a computer program product for performing embodiments of the present invention. As such, for example, each block or step of the flowcharts of FIG. 6, and combinations of blocks in the flowchart, may be implemented by various means, such as hardware, firmware, processor, circuitry and/or another device associated with execution of software including one or more computer program instructions. Thus, for example, one or more of the procedures described above may be embodied by computer program instructions, which may embody the procedures described above and may be stored by a storage device (e.g., memory 120) and executed by processing circuitry (e.g., processor 110).

As will be appreciated, any such stored computer program instructions may be loaded onto a computer or other programmable apparatus (i.e., hardware) to produce a machine, such that the instructions which execute on the computer or other programmable apparatus implement the functions specified in the flowchart block(s) or step(s). These computer program instructions may also be stored in a computer-readable medium comprising memory that may direct a computer or other programmable apparatus to function in a particular manner, such that the instructions stored in the computer-readable memory produce an article of manufacture including instructions to implement the function specified in the flowchart block(s) or step(s). The computer program instructions may also be loaded onto a computer or other programmable apparatus to cause a series of operational steps to be performed on the computer or other programmable apparatus to produce a computer-implemented process such that the instructions which execute on the computer or other programmable apparatus provide steps for implementing the functions specified in the flowchart block(s) or step(s). In this regard, a method according to example embodiments of the invention may include any or all of the operations shown in FIG. 6. Moreover, other methods derived from the descriptions provided herein may also be performed responsive to execution of steps associated with such methods by a computer programmed to be transformed into a machine specifically configured to perform such methods.

In an example embodiment, a method for aligning (e.g., optically aligning) two devices, as shown in FIG. 6, may include receiving an indication of a trigger event at a first targeting device (e.g., first device 20) configured to perform a positional determination regarding a downrange target at operation 200, capturing (e.g., at an image processor of the first targeting device) an image of a reference object disposed at a second targeting device (e.g., second device 30) configured to perform a targeting function relative to the downrange target at least in part responsive to the first targeting device being affixed to the second targeting device at operation 210, and determining pose information indicative of an alignment relationship between the first and second targeting devices relative to the downrange target based on the image captured at operation 220.

In some embodiments, certain ones of the operations above may be modified or further amplified as described below. Moreover, in some embodiments additional optional operations may also be included (an example of which is shown in dashed lines in FIG. 6). It should be appreciated that each of the modifications, optional additions or amplifications below may be included with the operations above either alone or in combination with any others among the features described herein. In this regard, in some embodiments the method may further include adjusting at least one parameter of the first targeting device to align the first targeting device with respect to at least on feature of the second targeting device relative to the downrange target based on the pose information at operation 230. In some embodiments determining the pose information may include capturing the image of the reference object and comparing feature data of the image captured to reference image feature data to determine the pose information. In an example embodiment, capturing the image may be performed responsive to power up of the first targeting device, operator input or affixing the first and second targeting devices. In some cases, determining the pose information may include boresighting the first and second targeting devices based on the pose information without any active transmission downrange. In an example embodiment, capturing the image may include capturing the image of the reference object having at least one face including a checkerboard pattern of square shapes. In some embodiments, capturing the image may include capturing the image of the reference object disposed at the second device to present an angled face to the image processor responsive to the first and second targeting devices being affixed to each other, where, for example, the angled face is offset from being perpendicular to a line of sight between the image processor and the reference object by approximately 45 degrees.

In an example embodiment, an apparatus for performing the method of FIG. 6 above may comprise a processor (e.g., the processor 110) configured to perform some or each of the operations (200-230) described above. The processor 110 may, for example, be configured to perform the operations (200-230) by performing hardware implemented logical functions, executing stored instructions, or executing algorithms for performing each of the operations. Alternatively, the apparatus may comprise means for performing each of the operations described above. In this regard, according to an example embodiment, examples of means for performing operations 200-230 may comprise, for example, the image processor 50. Additionally or alternatively, at least by virtue of the fact that the processor 110 may be configured to control or even be embodied as the image processor 50, the processor 110 and/or a device or circuitry for executing instructions or executing an algorithm for processing information as described above may also form example means for performing operations 200-230.

Many modifications and other embodiments of the invention set forth herein will come to mind to one skilled in the art to which these embodiments pertain having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

What is claimed is:

1. An alignment suite comprising:
    a first targeting device configured to perform a positional determination regarding a downrange target, the first targeting device comprising an image processor;
    a second targeting device configured to perform a targeting function relative to the downrange target, the second targeting device being affixable to the first targeting device;
    an optical coupler disposed to enable the image processor to capture an image of a reference object disposed at the second targeting device responsive to the first and second targeting devices being affixed together,
    wherein the image processor employs processing circuitry configured to determine pose information indicative of an alignment relationship between the first and second targeting devices relative to the downrange target based on the image captured.

2. The alignment suite of claim 1, wherein the image processor is configured to adjust at least one parameter of the first targeting device or the second targeting device to align the first targeting device with respect to at least one feature of the second targeting device relative to the downrange target based on the pose information.

3. The alignment suite of claim 1, wherein the image processor is configured to capture the image of the reference object and compare feature date of the image captured to reference image feature data to determine the pose information.

4. The alignment suite of claim 3, wherein the image processor is configured to capture the image responsive to power up of the first targeting device.

5. The alignment suite of claim 3, wherein the image processor is configured to capture the image responsive to affixing of the first targeting device and the second targeting device.

6. The alignment suite of claim 3, wherein the image processor is configured to capture the image responsive to operator input.

7. The alignment suite of claim 1, wherein the image processor is configured to determine the pose information and boresight the first and second targeting devices based on the pose information without any active transmission downrange.

8. The alignment suite of claim 1, wherein the reference object comprises at least one face including a checkerboard pattern of square shapes.

9. The alignment suite of claim 1, wherein the reference object is disposed at the second device to present an angled face to the image processor responsive to the first and second targeting devices being affixed to each other.

10. The alignment suite of claim 9, wherein the angled face is offset from being perpendicular to a line of sight between the image processor and the reference object by approximately 0 degrees through approximately 50 degrees.

11. A method comprising:
receiving an indication of a trigger event at a first targeting device configured to perform a positional determination regarding a downrange target;
capturing, at an image processor of the first targeting device, an image of a reference object disposed at a second targeting device configured to perform a targeting function relative to the downrange target at least in part responsive to the first targeting device being affixed to the second targeting device; and
determining pose information indicative of an alignment relationship between the first and second targeting devices relative to the downrange target based on the image captured.

12. The method of claim 11, further comprising adjusting at least one parameter of the first targeting device or the second targeting device to align the first targeting device with respect to at least on feature of the second targeting device relative to the downrange target based on the pose information.

13. The method of claim 11, wherein the determining the pose information comprises capturing the image of the reference object and comparing feature date of the image captured to reference image feature data to determine the pose information.

14. The method of claim 13, wherein the capturing the image is performed responsive to power up of the first targeting device.

15. The method of claim 13, wherein the capturing the image is performed responsive to affixing of the first targeting device and the second targeting device.

16. The method of claim 13, wherein the capturing the image is performed responsive to operator input.

17. The method of claim 11, wherein the determining the pose information comprises boresighting the first and second targeting devices based on the pose information without any active transmission downrange.

18. The method of claim 11, wherein the capturing the image comprises capturing the image of the reference object having at least one face including a checkerboard pattern of square shapes.

19. The method of claim 11, wherein the capturing the image comprises capturing the image of the reference object disposed at the second device to present an angled face to the image processor responsive to the first and second targeting devices being affixed to each other.

20. The method of claim 19, wherein the angled face is offset from being perpendicular to a line of sight between the image processor and the reference object by from approximately 0 degrees through approximately 50 degrees.

* * * * *